Patented Oct. 14, 1947

2,429,171

UNITED STATES PATENT OFFICE 2,429,171

BETAINE DERIVATIVES AND PROCESS OF MAKING SAME

Leopold Ruzicka and Placidus Plattner, Zurich, Switzerland, assignors to Ciba Pharmaceutical Products, Inc., Summit, N. J., a corporation of New Jersey No Drawing. Application April 28, 1944, Serial No. 533,262. In Switzerland February 26, 1943

5 Claims. (Cl. 260—344.6)

It has been found that derivatives of betaines can be obtained by causing organic compounds containing an active hydrogen or metal atom which is replaceable by an acyl group, to react with acid halides or anhydrides of betaine salts.

The following substances can be used as starting materials: aliphatic alcohols such as stearyl alcohol, alicyclic alcohols such as menthol, vitamin A and the alcohols of the steroid series such as testosterone, androsterone, corticosterone, desoxycorticosterone and dehydrocorticosterone; phenols, cresols, chlorphenols, oestrone, oestradiol or its monoesters, vitamin E, 2-methyl-naphthohydroquinone, genins of synthetic or naturally occurring cardiac substances and their glucosides, such as strophanthidin, strophanthin, digitoxigenin, gitoxin, gitoxigenin; primary and secondary amines or corresponding alkaloids; $\beta$-diketones, $\beta$-ketocarboxylic acid derivatives, the corresponding metal compounds, etc.

The acid halides or anhydrides of betaine salts used for the reaction can be obtained from betaines, their salts or ester salts, by the action of agents which are suitable for converting carboxylic acids or their salts into the corresponding acid halides or anhydrides.

The new process can be carried out in the presence of inert solvents and/or substances which combine with acids e. g. pyridine and other tertiary bases.

The derivatives of betaines obtained as described in the present process generally crystallize well and are soluble in water. They give sparingly soluble salts with many acids and alkaloid reagents, for example, chloroplatinates, chloroaurates, reineckates, picrates, picronolates and mercury double compounds, which can, if necessary, also be used for purification.

The present process is suitable for converting substances which are insoluble in water into water-soluble ones. It is of technical interest, for example, in its application to dyestuffs and to pharmacologically and physiologically active compounds. Also natural products which are active in the form of their glucosides but as aglucones lose their solubility in water and thus their specific activity, can be brought again into the water-soluble form. The present process can furthermore be used for preparing substances which react with the acid halides or anhydrides mentioned, from mixtures with compounds which do not react with the latter. As the products of the reaction are soluble in water, they can be separated in known way by means of a simple phase separation from the non-reacting substances which are insoluble in water, and then be reconverted by subsequent saponification into the original compounds.

The following examples illustrate the invention, but are not to be regarded as limiting it in any way, the parts being by weight:

Example 1

1.75 parts of cholesterol and 1 part of the acid chloride of betaine hydrochloride (prepared from betaine hydrochloride and phosphorus pentachloride in acetyl chloride) are boiled for 1 hour in 25 parts of dry chloroform. A colorless gelatinous mass is thereby formed. The latter is brought into solution by further addition of chloroform and filtered off from small quantities of insoluble matter. The chloroform is then distilled off and the residue extracted by boiling with ether. The part which is insoluble in ether gives, on recrystallization from methanol, fine needles which decompose at 230–231° C. The substance is the cholesteryl ester of betaine hydrochloride which forms a chloroplatinate decomposing at 225–227° C. and a picrate which crystallizes in yellow platelets and decomposes at 220–222° C.

Example 2

2 parts of cholestanol and 2 parts of the acid chloride of betaine hydrochloride are boiled for 2 hours in 30 parts of chloroform. After cooling, the undissolved part is filtered off, the chloroform solution evaporated down to dryness and the residue washed several times with ether. It is very hygroscopic and is recrystallized from methanol. In this way the cholestanyl ester of betaine hydrochloride is obtained, which decomposes at 227–229° C.

Example 3

1.5 parts of strophanthidine, 3 parts of the acid chloride of betaine hydrochloride and 1 part of dry pyridine are boiled for 90 minutes in 50 parts of chloroform. After this period of time the residue is filtered off and extracted several times by boiling with chloroform. The insoluble residue consists mostly of betaine hydrochloride. The filtrate is evaporated down, dried and the residue dissolved in 80 parts of aqueous methanol (50%) and treated with a little animal charcoal. After again evaporating down the faintly yellow solution, an almost colorless product is obtained which crystallizes out in fine needles on the addition of ethyl acetate. The strophanthidine ester of betaine hydrochloride thus obtained melts at 231.5–232.5° C.

Example 4

1.7 parts of $\Delta^{5:6:20:22}$-3:21-dihydroxy-nor-choladienic acid lactone and 1 part of the acid chloride of betaine hydrochloride are boiled for 2 hours in 4 parts of absolute chloroform. The faintly yellow solution is filtered, evaporated down and the residue dissolved in 50 parts of aqueous methanol (50%), when small amounts of insoluble matter remain. The solution is again evaporated down and the residue recrystallized from a mixture of methanol and ethyl acetate. Fine needles are obtained, melting point 226–227° C., which consist of the starting material which has been esterified in the 3-position with betaine hydrochloride.

Example 5

1.5 parts of menthol and 2 parts of the acid chloride of betaine hydrochloride are boiled for 3 hours in 50 parts of chloroform, when a considerable amount of hydrogen chloride is formed. After cooling, the excess betaine hydrochloride is filtered off and the filtrate evaporated down to dryness. The residue is boiled up with ether, the menthyl ester of betaine hydrochloride remaining undissolved. It crystallizes from acetone and melts at 223–224° C.

A solution of this ester in methanol gives, with a solution of mercuric chloride in methanol, a sparingly soluble, crystalline precipitate of a double salt, which can be decomposed again by means of hydrogen sulfide.

Example 6

1.2 parts of stearyl alcohol and 1.8 parts of the acid chloride of betaine hydrochloride are boiled for 2 hours in 50 parts of chloroform. The mixture is evaporated down to dryness, dissolved in methanol and a solution of 4 parts of mercuric chloride in methanol added. The white crystalline precipitate is filtered off by suction, washed, and again dissolved in hot methanol. By passing hydrogen sulfide through this solution, the double mercury salt is decomposed. The precipitated mercuric sulfide is then filtered off and the colorless filtrate evaporated down to dryness. On the addition of acetone, the stearyl ester of betaine hydrochloride crystallizes out and, after recrystallization, sinters at 107° C. and decomposes at 140° C.

Example 7

2 parts of the acid chloride of betaine hydrochloride and 1.5 parts of para-hydroxy-benzoic acid methyl ester are boiled for 3 hours in 50 parts of chloroform. After cooling, the mass is filtered, the filtrate evaporated down to dryness and the remaining hydrochloric acid driven off by the repeated addition of chloroform and evaporation of the same. The residue is recrystallized from a mixture of chloroform and ethyl acetate. The derivative of para-hydroxy-benzoic acid methyl-ester obtained in this way melts at 174–175° C., is extremely soluble in water and gives a sparingly soluble double salt with mercuric chloride.

Example 8

An extract from 50,000 parts of urine from pregnant women is first of all treated in usual manner with the chloride of trimethyl-ammonium acetic acid hydrazide. The ethereal solution, which contains the non-ketonic components is evaporated down, and chloroform added to the residue which is dehydrated by distilling off part of the solvent. 1 part of the acid chloride of betaine hydrochloride and 1 part of dry pyridine are added and the whole shaken for 24 hours on a mechanical shaker. A few parts of methanol are then added and the solution evaporated down in vacuo. The residue is dissolved in ether and dilute acid, the part which is soluble in acid saponified with dilute alkali and in this way a partly crystalline substance obtained from which about 0.3 part of pregnane-diol can be obtained.

Example 9

5 parts of androstene-dione are biochemically reduced in a known way. The product of the reaction is extracted and treated in chloroform solution with the acid chloride of betaine hydrochloride. On working up as described in Example 8, 2.5 parts of testosterone are obtained from the acid-soluble components.

Example 10

2 parts of $\beta'$-[$\Delta^5$-3 $\beta$-hydroxy-nor-cholenyl-(23)]-$\Delta^{\alpha',\beta'}$-butenolide and 1.8 parts of the acid chloride of betaine hydrochloride are boiled for 2 hours in 50 parts of absolute chloroform. After cooling, the mass is filtered and the residue boiled 3 times with chloroform, some betaine hydrochloride remaining undissolved. The chloroform solution is filtered through 4 parts of aluminum oxide. Traces of impurities are eluted by subsequent washing with chloroform. On elution of the chromatogram with methanol, a crystalline substance is obtained which melts, after recrystallization, at 225–228° C. It consists of the starting material esterified in the 3-position with betaine hydrochloride.

Example 11

1 part of desoxycorticosterone and 1 part of betainyl chloride are boiled under reflux for 2 hours with 130 parts of absolute chloroform. During this period a little chloroform is distilled off several times to remove the hydrogen chloride formed, a procedure which is most easily carried out by emptying the reflux condenser. 0.2 part of water is then added and the whole boiled under reflux for another hour to decompose the excess betainyl chloride. The excess water is removed by distilling off part of the chloroform. The turbid liquid is then filtered through a glass filter. This filtrate and a further extract of the filtrate residue with chloroform give on evaporating down, 1.5 parts of residue. They are dissolved in chloroform and made to crystallize by the addition of ethyl acetate. The mother liquor gives a further quantity of almost white crystalline powder. In this way a yield of 89 per cent of the crude crystalline product is obtained. After recrystallizing four times, the substance melts at 219.5–220.5° C. The solubility in water at 20° C. is 9.1 per cent.

What we claim is:

1. Process for the manufacture of betaine derivatives, comprising treating members selected from the group consisting of cardiac glycosides and their aglycones which contain a member of the group consisting of an active hydrogen atom and an active metal atom, both being replaceable by an acyl group, with a member of the group of acid halides and anhydrides of betaine salts.

2. Process for the manufacture of betaine derivatives, comprising treating members selected from the group consisting of cardiac glycosides and their aglycones which contain a member of the group consisting of an active hydrogen atom and an active metal atom, both being replaceable by an acyl group, in mixture with organic compounds which are not capable of being acylated, with a member of the group of acid halides and anhydrides of betaine salts, separating the acylated from the unchanged substances and regenerating the parent substances of the former compounds by means of hydrolyzing agents.

3. An ester of an estrogenically active hydroxylated cyclopentanopolyhydrophenanthrene with a betaine salt.

4. An ester of desoxycorticosterone with a betaine salt.

5. An ester of an aglycone of a cardiac glycoside with a betaine salt.

LEOPOLD RUZICKA.
PLACIDUS PLATTNER.

REFERENCES CITED

The following references are of record in the file of this patent:

UNITED STATES PATENTS

| Number | Name | Date |
|---|---|---|
| 2,265,183 | Miescher | Dec. 9, 1941 |
| 2,359,862 | Linch | Oct. 10, 1944 |

OTHER REFERENCES

Ahderhalden, "Zeit. Physiol Chem.," 65, pp. 69–77.